US 6,671,616 B2

(12) United States Patent
Burt et al.

(10) Patent No.: US 6,671,616 B2
(45) Date of Patent: Dec. 30, 2003

(54) ONE-WAY ROAD POINT SYMBOL GENERATION

(75) Inventors: Wylie R. Burt, Ypsilanit, MI (US); Mark Gibb, Waterford, MI (US)

(73) Assignee: General Motors Corporation, Detroit, MI (US)

( * ) Notice: Subject to any disclaimer, the term of this patent is extended or adjusted under 35 U.S.C. 154(b) by 186 days.

(21) Appl. No.: 10/012,085

(22) Filed: Dec. 7, 2001

(65) Prior Publication Data

US 2003/0109982 A1 Jun. 12, 2003

(51) Int. Cl.[7] .................. G01C 21/00; G01S 21/00; G06G 7/78
(52) U.S. Cl. ............... 701/200; 701/201; 701/202; 701/208; 701/211
(58) Field of Search ............... 701/200, 201, 701/202, 208, 211

(56) References Cited

U.S. PATENT DOCUMENTS

| | | | | |
|---|---|---|---|---|
| 5,274,387 A | * | 12/1993 | Kakihara et al. | 342/451 |
| 5,787,382 A | * | 7/1998 | Kurabayashi | 701/214 |
| 5,821,878 A | * | 10/1998 | Raswant | 340/907 |
| 5,893,898 A | * | 4/1999 | Tanimoto | 701/201 |
| 5,959,553 A | * | 9/1999 | Raswant | 340/907 |
| 6,559,865 B1 | * | 5/2003 | Angwin | 345/765 |
| 2003/0130789 A1 | * | 7/2003 | McDonough | 701/209 |

* cited by examiner

Primary Examiner—William A. Cuchlinski, Jr.
Assistant Examiner—Brian J Broadhead
(74) Attorney, Agent, or Firm—Anthony Luke Simon

(57) ABSTRACT

The present invention provides a method, system, and computer usable medium for indicating road direction for vehicle instruction for a one-way street. This may be done when a road database is provided and includes at least one start point and at least one end point to indicate a portion of the road. This may also be done by determining a center point between the start and end point. This may also be done by determining a compass bearing from the center point based on the position of the start point and end point. This may also be done by determining an angle of orientation indicator based on the compass bearing of the center point.

23 Claims, 3 Drawing Sheets

2

ONE-WAY ROAD POINT SYMBOL GENERATION

FIELD OF THE INVENTION

This invention relates generally to the navigation of a moving vehicle. In particular this invention relates to a method and system of indicating a direction of traffic flow for a one-way street.

BACKGROUND OF THE INVENTION

Geographical Information System (GIS) databases continue to be vastly used to visualize coordinates and maps of streets at various locations. For example such a database may include existing directions and coordinates for the entire United States which may be provided by different road data providers. Roads on these maps are usually provided by two points (nodes) and a line connecting these two points is drawn. Referencing nodes toward each other indicates the direction of travel.

These databases prove very useful for large companies specializing in providing road directions to consumers. Vehicles having an onboard database and a processor capable of generating maps on its own can also take advantage of these databases. After the loading of the database a user is able to visualize the road map system of interest. In conventional GIS database loading methods, however, a user is able to visualize a map of a one-way street, but is unable to know which way the traffic flows along that one-way street.

One alternative is the use of properly digitized data. If the data is digitized in the direction of traffic flow, wherein the nodes are referenced towards each other properly, then arrows can be assigned to indicate the direction of traffic flow. Unfortunately, road data providers do not typically digitize the data in the direction of travel. Instead, these providers supply the road data with certain attributes that in conjunction with database rules provide the direction of travel. These attributes may include road lines, direction of travel attributes associated with these lines, and rules to understand these attributes. This type of road data cannot be displayed with arrows and thus a user cannot visualize the direction of traffic flow on the map.

This information is critical for a vehicle traveling on a one-way street, as well as an advisor directing a vehicle along a visualized map.

It is therefore desirable to provide a method to indicate the direction of traffic flow along a one-way street that overcomes the above disadvantages.

SUMMARY OF THE INVENTION

One aspect of the present invention provides a method of indicating road direction for vehicle instruction for a one-way street. A road database is provided and includes at least one start point and at least one end point to indicate a portion of the road. A center point is determined between the start and end point. A compass bearing is determined from the center point based on the position of the start point and end point. An angle of orientation indicator based on the compass bearing of the center point is determined.

An arrow symbol may be associated to the compass bearing and to the corresponding angle of orientation to indicate the direction of traffic flow. The associated arrow symbol may be stored in an arrow symbol database. It may be determined whether a distance between the start point and the end point does not exceed a distance tolerance value. An elapsed time between an initiating point in time when the start point and end point are selected and a terminating point in time when the angle of orientation is determined may be calculated.

The method may also comprise of determining a center point between the start and the end point. The compass bearing determination may comprise of determining the compass bearing of the center point based on the coordinates of the start and end point. The determined start point, center point, and bearing attributes may be stored into at least one file database.

When the start and end points are nodes on a line, the compass bearing determination may comprise of determining the compass bearing of the center point based on the nodes, a direction of travel attribute for the line, and road database rules. The determined bearing attributes and center point may be stored into at least one output file database.

Another aspect of the invention provides a navigation system for indicating road direction for vehicle instruction for a one-way street. The system includes means for providing at least one start point and at least one end point to indicate a portion of the road. The system also provides means for determining a center point between the start and end point. The system also provides means for determining a compass bearing based on the position of the start and end point. The system also provides means for determining an angle of orientation indicator based on the compass bearing of the center point.

The system may include means for associating an arrow symbol to the compass bearing and the corresponding angle of orientation to indicate the direction of traffic flow. The system may also include means for determining whether a distance between the start point and the end point does not exceed a distance tolerance value. The system may also include means for calculating an elapsed time between an initiating point in time when the start and the end point are selected and a terminating point in time when the angle of orientation is determined. The system may also include means for determining the compass bearing of the center point based on the coordinates of the start and end point. When the start and end points are nodes on a line the system may provide means for determining the compass bearing by determining the compass bearing of the center point based on the nodes, a direction of travel attribute for the line, and road database rules.

Another aspect of the invention provides a computer usable medium including a program for generating navigation instructions for a vehicle indicating road direction for a one-way street. The medium includes computer readable program code that provides a road database that includes at least one start and end point to indicate a portion of the road. The medium also includes computer readable program code that determines a center point between the start and end point. The medium also includes computer readable program code that determines a compass bearing from the center point based on the position of the start and end point. The medium also includes computer readable program code that determines the angle of orientation indicator based on the compass bearing of the center point.

The medium may include computer readable program code that associates an arrow symbol to the compass bearing and the corresponding angle of orientation to indicate the direction of traffic flow. The medium may also include computer readable program code that stores the arrow symbol in an arrow symbol database. The medium may also determine whether the distance between the start point and the end point does not exceed a distance tolerance value. The medium may include computer readable program code that calculates an elapsed time between an initiating point in time when the start and end points are selected and a terminating point in time when the angle of orientation is determined.

If the determination of the compass bearing comprises of determining the compass bearing of the center point based on the coordinates of the start and end point the medium may provide computer readable program code that determines the compass bearing of the center point. The medium may also provide computer readable program code that saves the start point with bearing attributes into at least one file database.

If the start and end points are nodes on a line the medium may provide computer readable program code that determines the compass bearing of the center point based on the nodes, a direction of travel attribute for the line, and road database rules. The medium may also provide computer readable program code that saves the at least one center point with bearing attributes into at least one output file database.

The foregoing and other features and advantages of the invention will become further apparent from the following detailed description of the presently preferred embodiment, read in conjunction with the accompanying drawings. The detailed description and drawings are merely illustrative of the invention rather than limiting, the scope of the invention being defined by the appended claims and equivalents thereof.

DETAILED DESCRIPTION OF THE PRESENTLY PREFERRED EMBODIMENTS

Figure 1:
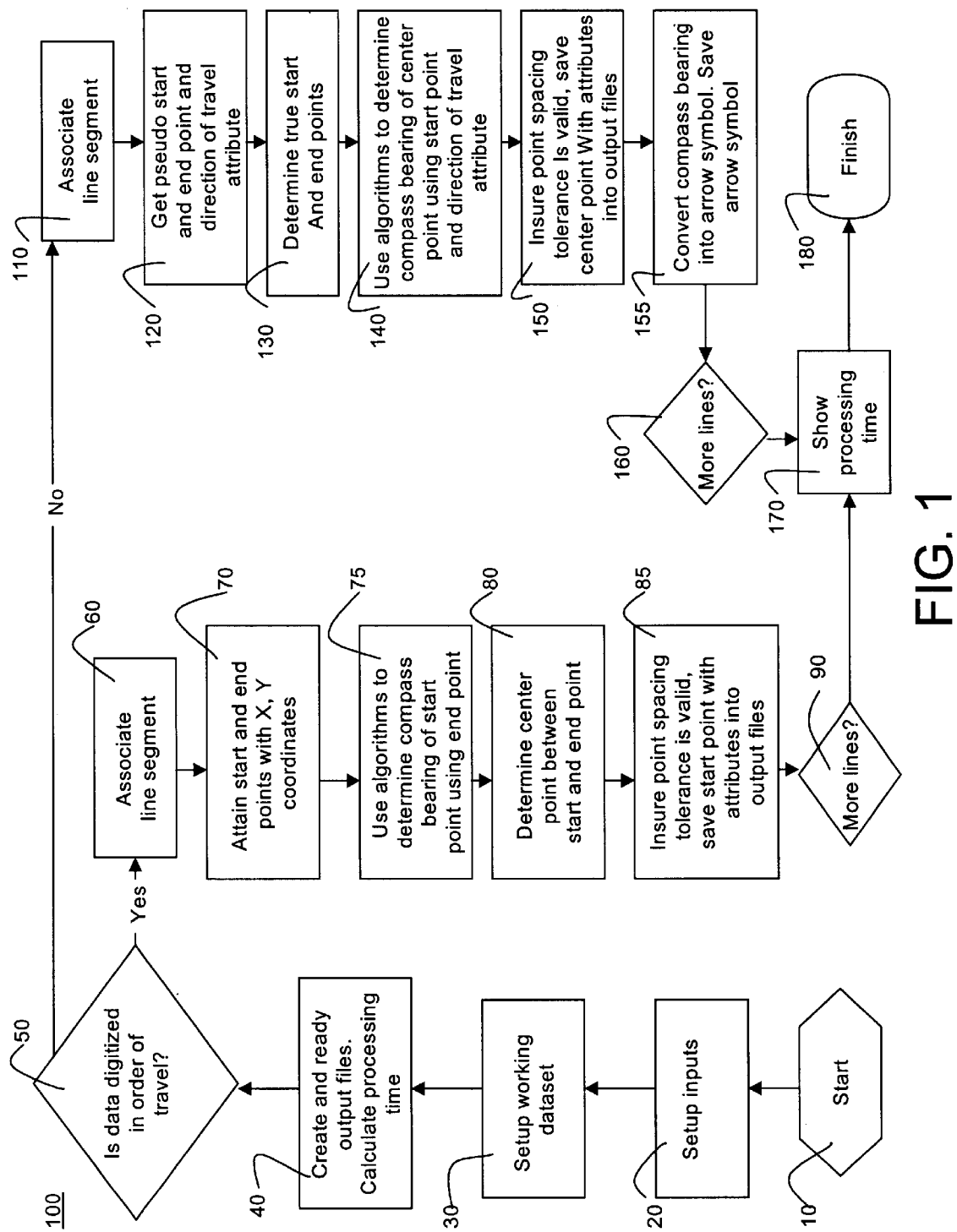
FIG. 1 is a flow diagram of one embodiment of a method for generating one-way road point symbols in accordance with the present invention.

FIG. 1 shows a flow diagram of one embodiment of a method for indicating a direction of traffic flow for a one-way street in accordance with the present invention at 100.

As seen in block 10, the method may initiate when a user puts in setup inputs. This may happen by a user simply running a pre-set computer program. These inputs 20 may comprise one or more coordinate databases of one way-streets containing road spatial data, road attribute data, database rules, and a tolerance for point spacing value. Coordinate databases may be any suitable databases for storing such location coordinates as latitude and longitude of a variety of locations. These locations may be, for example, points of interest. Coordinate databases may also be a database of street addresses. Coordinate databases may also be a database of routes between points. Road spatial data may be any number of points indicating the start and end points of a portion of a road. Road attribute data may contain lines of travel between the points. Road attribute data may also contain a direction of travel along these lines. Road database rules may be guidelines used to interpret the road spatial data and road attributes. The distance tolerance spacing value may be a user-defined value to indicate how close the road points may be to one another.

As seen in block 30, a working dataset may be setup using setup inputs.

As seen in block 40, the output files may then be created. The output files may then be readied for processing. One or more distinct file databases may then be created to provide a storage location for the output. The processing time may then be calculated. This may be done by calculating the number of records in the database, and dividing this number by the rate at which the coordinate database can be processed. The method may then comprise converting the time to minutes, rounding, and displaying an estimated time in minutes of the total processing time.

As seen in block 50 the method may then comprise checking to see whether or not the data included in the coordinate systems of block 20 is digitized in the order of travel. If the road spatial data is digitized then the coordinates may have an attribute indicating a relation to each other. Digitized coordinate databases may consist of defined start and end points, according to the attribute. If the data in the coordinate database is digitized in the correct order it may be taken to block 60 in the method.

As seen in block 60, a line segment may be associated to the coordinate points going from the start point to the end point in the coordinate database system. A line segment indicates a portion of the road between the two points.

As seen in block 70, the start and end point may be obtained from the coordinate databases with X and Y coordinates. These coordinates may reference the points to each other in space. The method may further consist of determining and distinguishing between the start and end point.

As seen in block 75, the one or more algorithms may then be used to determine a compass bearing of the start point using the end point. A compass bearing may be a compass direction from the start point to the end point based on a 360 degree system. Using a 360 degree system a quadrant may be determined for the direction from the start point to the end point. An angle may then be calculated from the start point to the end point against a horizontal. The bearing may also be converted to an arrow symbol to indicate the proper direction of travel along a one-way street.

As seen in block 80, a center point may be determined between the start and end point.

As seen in block 85 the distance tolerance value may then be checked so that no points are closer to each other than this value. If these points pass the distance tolerance value test they may be saved with bearing attributes into one or more output files for later retrieval. An arrow symbol may then be associated with the bearing attribute. The arrow symbol may be placed at the center point and saved into an arrow symbol database for later use.

As seen in block 90, the method may then check whether more lines have been left unprocessed. The method may then repeat until all the lines have been processed and all the proper output has been saved into the one or more output file databases and arrow symbol database.

As seen in block 170, when all the lines have been processed the method may then consist of showing the actual processing time. The actual processing time may be determined by the elapsed time between when the start and end point is obtained and between the time the bearing attributes are determined and saved into the at least one output file database for all such lines in the coordinate database.

As seen in block 110, when the data is not digitized in the direction of travel a line segment may be associated between coordinate points in the coordinate database system. Coordinate databases not digitized in the direction of travel have points not referenced towards each other in the direction of travel. A line segment may indicate a portion of the road between the two points. The two points may then be referred to as nodes on a line.

As seen in block 120, a pseudo start and end point may be obtained from the coordinate database. The method consists of selecting two nodes associated with a line segment and randomly calling one a start point and one an end point. A direction of travel attribute may also be associated with the line.

As seen in block 130, a true start and end point may then be determined based on the direction of travel attribute and knowledge of road database rules. The travel attribute may comprise information regarding whether the road is a one-way road or not. Knowledge of road database rules may comprise of understanding how to interpret the direction of travel attribute.

As seen in block 140 any number of known algorithms may then be used to determine a center point between the two nodes and determine a compass bearing for the center point using the reference node and direction of travel attribute. A center point may be determined based on the distance between the nodes, and be placed in the middle of the two. A compass bearing may then be determined for the center point by calculating an angle from the reference node to the center point. The angle may then be converted to a compass bearing.

As seen in block 150 the method may insure that the distance between the points in the coordinate database system is not less than the distance tolerance value. The compass bearing and the center point may then be saved to one or more file output databases for later use.

As seen in block 155 the compass bearing attribute may also be converted into an arrow to indicate a proper direction along a one-way street. The arrow symbol may be placed at the center point and saved into an arrow symbol database for later use.

As seen in block 160 the method may then check whether more lines have been left unprocessed. The method may then repeat until all the lines have been processed and all the output center points and associated compass bearings have been saved into the one or more output file databases.

As seen in block 170 when all the lines have been processed the method may then show the actual processing time. The actual processing time may be determined by the elapsed time between when the nodes on a line are obtained and between the time when the bearing attributes are determined and saved into the at least one output file database for all such lines in the coordinate database.

As seen in block 180 when all the lines in the coordinate database have been processed and the output has been saved to the at least one file database the method then consists of finishing and indicating to the user of its proper completion.

Figure 2:
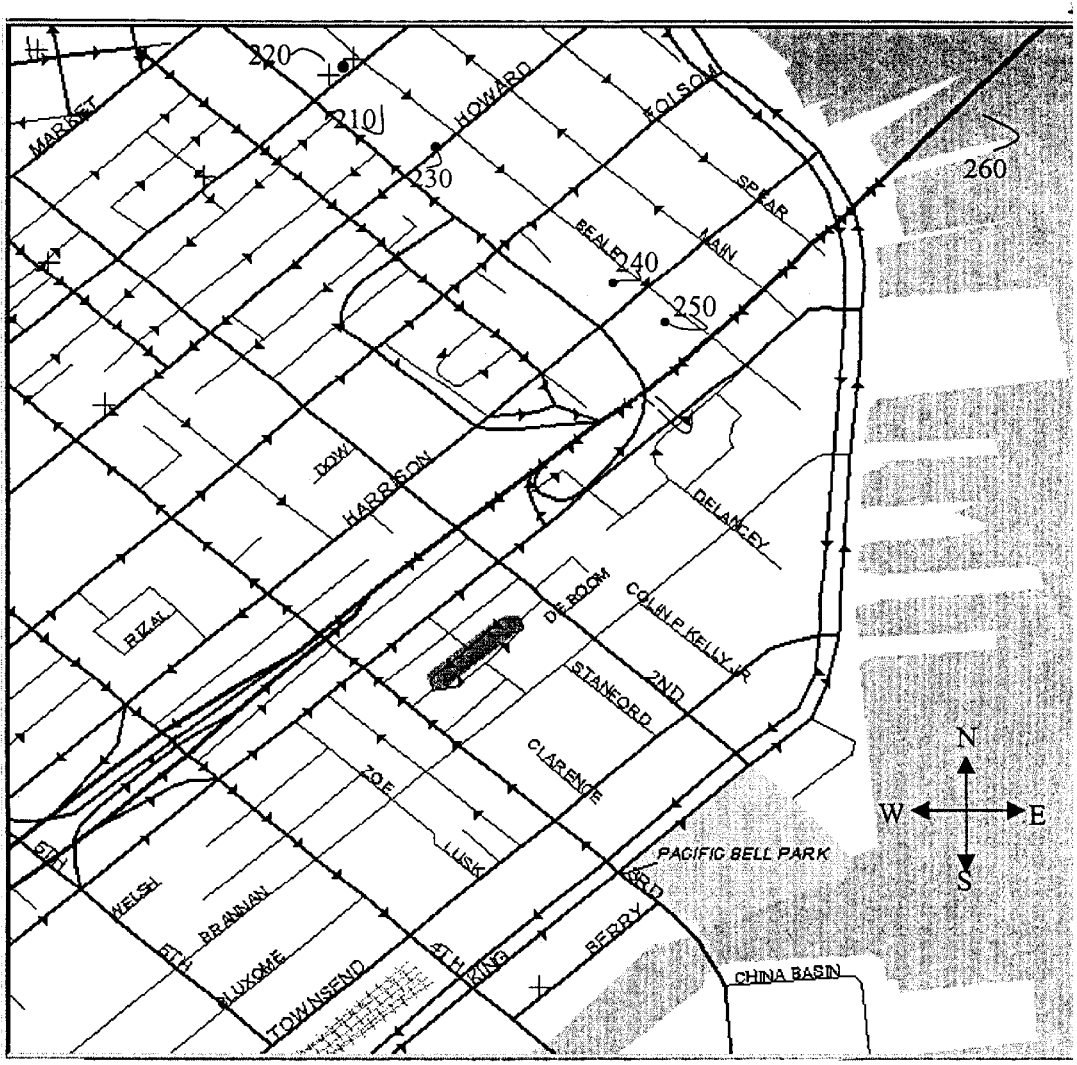
FIG. 2 is a map of streets wherein one embodiment of a method for generating one-way road point symbols has been applied in accordance with the present invention.

FIG. 2 shows a map wherein one embodiment of a method for generating one-way road point symbols has been applied in accordance with the present invention.

As seen in 100, road network database systems indicating one-way streets may be loaded into the system. The road network databases may be both digitized and not digitized. Another database system may be loaded associating road names with the lines of roads. The arrow symbol database and other output file databases may also be loaded into the system to associate a direction of travel along a one-way street with an arrow 210. The coordinate points may comprise nodes on a street as in 220 and 230. A center point may then be associated with the two points. The arrow symbol 210 may then be placed at the center point indicating a direction of travel for that road segment.

As seen in 200 the road database may also comprise points of interest as shown for example at numerals 240 and 250. A center point may then be determined between the two points of interest. The arrow symbol 210 may then be placed at the center point indicating a direction of travel for that road segment.

The center street 260 is in actuality a highway comprising two different one-way streets. Upon a closer magnification it is possible to see two different streets with two different angle of direction indicator arrows assigned to each different street. It may also be possible to see the center street highway 260 splitting into two distinct streets on the western part of the map 200. The same method 100 is applied to this highway to indicate a direction of travel.

Figure 3:
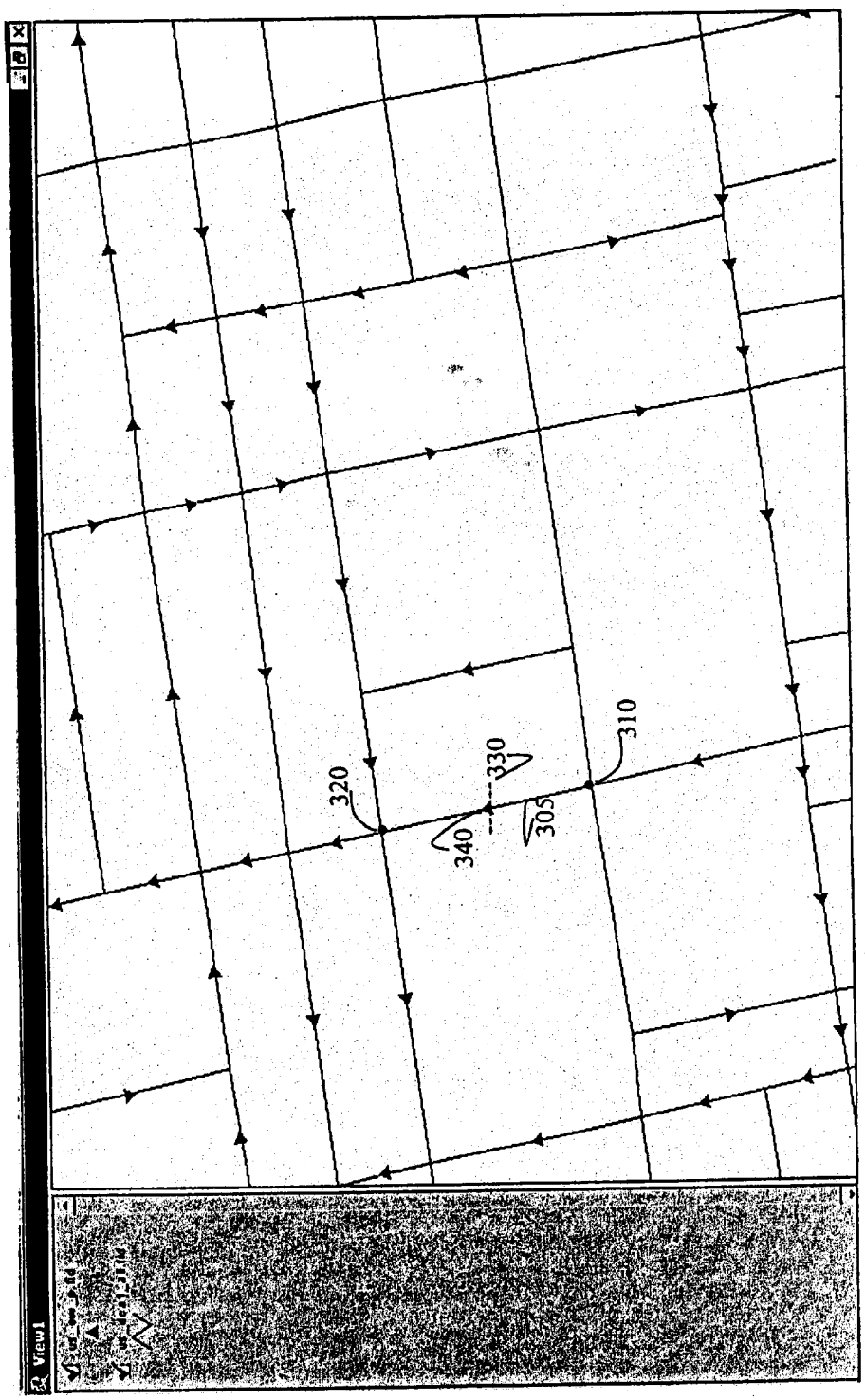
FIG. 3 is an enlargement of the map of FIG. 2 with the road names removed, illustrating details in accordance with the present invention.

FIG. 3 shows an enlargement of a map of FIG. 2 with road names database removed, wherein one embodiment of a method for generating one-way road point symbols has been applied in accordance with the present invention for clearer illustration of the details.

As seen in 300 the method may comprise loading the road network database system. Two nodes on a line 310 and 320 may then be selected. A reference node may also then be selected. In the case of a perfectly horizontal line the reference node may be the western most node. In the case of any other line segment, such as line segment 305 lying between nodes 310 and 320, the reference node may be the southern most node 310. A direction of travel attribute for the road may then be determined. As shown in 130 the direction of travel attribute may contain an F or T value, where F indicates a direction from the reference node and T indicates a direction towards the reference node. In the case of road segment 305 the road attribute is F, indicating the direction of travel to be from 310 to 320. A center point 330 between 310 and 320 may then be determined. An arrow 340 indicating the determined direction of travel may then be placed on the center point. These steps may then be repeated for all such coordinate points in the database.

It should be appreciated that the embodiments described above are to be considered in all respects only illustrative and not restrictive. The scope of the invention is indicated by the following claims rather than by the foregoing description. All changes that come within the meaning and range of equivalents are to be embraced within their scope.

We claim:

1. A method of indicating road direction for vehicle instruction for a one-way street comprising:

providing a road database including at least one start point and at least one end point to indicate a portion of the road;

determining a center point between the start and end point;

determining a compass bearing from the center point based on the position of the start point and end point; and determining an angle of orientation indicator based on the compass bearing of the center point.

2. The method of claim 1, further comprising:

associating an arrow symbol to the compass bearing and the corresponding angle of orientation to indicate the direction of traffic flow.

3. The method of claim 2 further comprising:

storing a point associated with the arrow symbol in a one-way point.

4. The method of claim 1 further comprising:

determining whether a distance between the start point and the end point exceeds a distance tolerance value.

5. The method of claim 1 further comprising:

calculating an elapsed time between an initiating point in time when the start point and end point are selected and a terminating point in time when the angle of orientation is determined.

6. The method of claim 1 wherein determining the compass bearing comprises determining the compass bearing of the center point based on the coordinates of the start and end point.

7. The method of claim 6 further comprising:

saving the start point with bearing attributes into at least one file database.

8. The method of claim 1 wherein the start and end points are nodes on a line, determining the compass bearing comprises determining the compass bearing of the center point based on the nodes, a direction of travel attribute for the line segment, and road database rules.

9. The method of claim 8 further comprising:

saving the at least one center point with bearing attributes into at least one output file database.

10. A navigation system for indicating road direction for vehicle instruction for a one-way street comprising:

means for providing at least one start point and at least one end point to indicate a portion of the road;

means for determining a center point between the start point and end point;

means for determining a compass bearing based on the position of the start and end point; and means for determining an angle of orientation indicator based on the compass bearing of the center point.

11. The system of claim 10 further comprising:

means for associating an arrow symbol to the compass bearing and the corresponding angle of orientation to indicate the direction of traffic flow.

12. The system of claim 10 further comprising:

means for determining whether a distance between the start point and the end point exceeds a distance tolerance value.

13. The system of claim 10 further comprising:

means for calculating an elapsed time between an initiating point in time when the start and the end point are selected and a terminating point in time when the angle of orientation is determined.

14. The system of claim 10 further comprising:

means for determining the compass bearing of the center point based on the coordinates of the start and end point.

15. A computer usable medium including a program for generating navigation instructions for a vehicle indicating road direction for a one-way street, comprising:

computer readable program code that provides a road database that includes at least one start and end point to indicate a portion of the road;

computer readable program code that determines a center point between the start and end point;

computer readable program code that determines a compass bearing from the center point based on the position of the start and end point; and computer readable program code that determines the angle of orientation indicator based on the compass bearing of the center point.

16. The medium of claim 15 further comprising:

computer readable program code that associates an arrow symbol to the compass bearing and the corresponding angle of orientation to indicate the direction of traffic flow.

17. The medium of claim 16 further comprising:

computer readable program code to store a point associated with the arrow symbol in a one-way point.

18. The medium of claim 15 further comprising:

computer readable program code that determines whether the distance between the start point and the end point does not exceed a distance tolerance value.

19. The medium of claim 15 further comprising:

computer readable program code that calculates an elapsed time between an initiating point in time when the start and end points are selected and a terminating point in time when the angle of orientation is determined.

20. The medium of claim 15 wherein determining the compass bearing of the center point comprises determining the compass bearing of the center point based on the coordinates of the start and end point.

21. The medium of claim 20 further comprising:

computer readable program code that saves the start point with attributes into at least one file database.

22. The medium of claim 15 wherein the start and end point are nodes on a line and further comprising computer readable program code that determines the compass bearing of the center point based on the nodes, a direction of travel attribute for the line segment, and road database rules.

23. The medium of claim 22 further comprising:

computer readable program code that saves the at least one center point with attributes into at least one output file database.

* * * * *